(12) United States Patent
Augenstein et al.

(10) Patent No.: US 12,074,777 B2
(45) Date of Patent: Aug. 27, 2024

(54) DATA CENTER SELECTION FOR CLOUD APPLICATION DEPLOYMENT

(71) Applicant: SAP SE, Walldorf (DE)

(72) Inventors: Marius Augenstein, Walldorf (DE); Fabian Schaefer, Karlsruhe (DE); Max Lenk, Leimen (DE); Buelent Karasu, Nussloch (DE); Oktay Simsek, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/070,569

(22) Filed: Nov. 29, 2022

(65) Prior Publication Data

US 2023/0336452 A1    Oct. 19, 2023

(30) Foreign Application Priority Data

Apr. 19, 2022   (EP) .................................... 22168780

(51) Int. Cl.
*G06F 15/173*   (2006.01)
*G06F 9/50*     (2006.01)
*H04L 43/0852*  (2022.01)
*H04L 43/0894*  (2022.01)
*H04L 43/55*    (2022.01)

(52) U.S. Cl.
CPC ........ *H04L 43/0852* (2013.01); *G06F 9/5027* (2013.01); *G06F 9/5072* (2013.01); *H04L 43/0894* (2013.01); *H04L 43/55* (2022.05); *G06F 2209/501* (2013.01); *G06F 2209/5015* (2013.01)

(58) Field of Classification Search
CPC . H04L 43/0852; H04L 67/10; H04L 41/5054; H04L 41/5041; H04L 41/5045; H04L 41/5051; G06F 8/60; G06F 9/46
USPC .......................................... 709/203, 223, 224
See application file for complete search history.

(56) References Cited

U.S. PATENT DOCUMENTS

| | | | | |
|---|---|---|---|---|
| 6,598,075 | B1* | 7/2003 | Ogdon ................. | H04L 63/083 |
| | | | | 348/E7.083 |
| 10,530,632 | B1* | 1/2020 | Mukhopadhyaya .... | H04L 43/08 |
| 10,856,121 | B1* | 12/2020 | Chastain ............... | H04W 48/18 |
| 2003/0158930 | A1* | 8/2003 | McBride ................ | H04L 41/22 |
| | | | | 709/223 |
| 2008/0049755 | A1* | 2/2008 | Gannon ................ | H04L 41/082 |
| | | | | 370/468 |

(Continued)

FOREIGN PATENT DOCUMENTS

EP          3754494 A1    12/2020

OTHER PUBLICATIONS

"The European Search Report", dated Sep. 9, 2022 (dated Sep. 9 2022), issued by the Eurpoean Patent Office, for EP Application No. 22168780.9, 12 pgs.

(Continued)

*Primary Examiner* — Richard G Keehn
(74) *Attorney, Agent, or Firm* — Buckley, Maschoff & Talwalkar LLC (57) ABSTRACT

Some embodiments are directed to a data center selection device for cloud-based application deployment. The device may send a request for test data from multiple test applications at multiple data centers and determine separate network statistics for the multiple data centers. A data center may be selected based at least in part on the measured network statistics, where an application may be deployed.

20 Claims, 4 Drawing Sheets

(56) References Cited

U.S. PATENT DOCUMENTS

| | | | | |
|---|---|---|---|---|
| 2011/0164562 | A1* | 7/2011 | Qiu | H04W 72/543 |
| | | | | 370/328 |
| 2013/0046664 | A1* | 2/2013 | Kazerani | G06F 11/1433 |
| | | | | 705/34 |
| 2015/0089274 | A1* | 3/2015 | Mares | H04L 51/224 |
| | | | | 714/4.11 |
| 2015/0120939 | A1* | 4/2015 | Islam | H04L 47/70 |
| | | | | 709/226 |
| 2017/0126512 | A1* | 5/2017 | Seed | H04L 41/5045 |
| 2019/0140910 | A1* | 5/2019 | Ganapathi | H04L 41/145 |
| 2019/0141549 | A1* | 5/2019 | Ganapathi | G06F 30/00 |
| 2020/0014609 | A1* | 1/2020 | Hockett | H04L 43/08 |
| 2023/0060852 | A1* | 3/2023 | Sidebottom | H04L 41/5006 |

OTHER PUBLICATIONS

Kofahi Najib A et al: "Priority-Based and 1-15 Optimized Data Center Selection in Cloud Computing", Arabian Journal for Science and Engineering, Springer Berlin Heidelberg, Berlin/Heidelberg, vol. 44, No. 11, Apr. 12, 2019 (Apr. 12, 2019), pp. 9275-9290, XP036891003, ISSN: 2193-567X, DOI: 10.1007/SI3369-019-03845-3 [retrieved on Apr. 12, 2019].

* cited by examiner

DATA CENTER SELECTION FOR CLOUD APPLICATION DEPLOYMENT

CROSS-REFERENCE TO RELATED APPLICATIONS

The present application claims priority under 35 U.S.C. § 119(a) to European Patent Application No. 22168780.9, filed Apr. 19, 2022, the contents of which are incorporated herein by reference for all purposes.

TECHNICAL FIELD

The presently disclosed subject matter relates to a data center selection device, a directory server, a data center selection method, a directory serving method, and a computer readable medium.

BACKGROUND

Increasingly, applications, in particular enterprise applications, are hosted in the cloud. Applications run on large computing servers, or data centers. Such servers are provided by companies that are sometimes referred to as hyperscalars. Hyperscalars provide the technical ability to seamlessly scale large applications and provide services over a computer network, such as networking, data storage, computing resources, at the desired scale. Examples of hyperscaler companies include Google, Microsoft, Facebook, Alibaba, and Amazon.

For example, an application may be moved to a hyperscalar, thus leveraging the benefits of a cloud-infrastructure such as being able to quickly scale resources as required by the demands of an application. Unfortunately, there are a number of different cloud companies offering cloud services, each of which employ many servers around the world. A question thus arises: how to find the best data center to host an application. Since applications in a business environment are often connected via hyperscaler boundaries, known as Cloud to Cloud, it may also be important to know the speed between the datacenters.

The choice is not unimportant. It was found in practice that the particular choice has a significant impact on the quality of service that an end-user experiences with the application. For example, many applications require low latency. Which server will provide low-latency is hard to predict however, as it depends on the computer network between the end-user's device and the server used for the cloud service. That computer network is in part outside the control of the both the end-user and the cloud service provider.

SUMMARY

It would be advantageous to have an improved way to select a data center where to deploy an application. Although requirements on local computing and/or other resources can reduce significantly by moving an application in the cloud, the downside of such a move is that application delay will be influenced by network delay, if not dominated by it. For example, say, a logistic application used in a company may run on relatively simple hardware if the application in actual fact runs in the cloud. However, the downside of increased latency may make the application much harder to use.

Thus careful selection of the data center where an application is to be deployed is important. Unfortunately, it is hard, if not impossible to predict which data center will give good performance as to network delay. Although geographically nearby data centers tend to do better on average, this relationship is too tenuous. In an embodiment, a data center selection device assists in selecting a data center and the deployment of a cloud-based application. The data center selection device may receive computer network addresses of multiple data centers, and measure network connectivity delays for the multiple data centers. A data center may be selected at least in part on the corresponding network statistics for the data centers. The cloud-based application may then be deployed at the selected data center. By selecting a data center with lower network connective delay, the use of the application will be better.

For example, an application may be deployed by configuring the cloud-based application at the selected data center for deployment, and/or by causing the cloud-based application to be uploaded to the selected data center, etc.

Network delay may be separated into different kinds, in particular, delay for small packets and for large packets can be different. The former is expressed in a statistic known as latency, the latter as bandwidth.

A directory server may cooperate with the data center selection device. The directory server may maintain a directory of multiple data centers and multiple associated test applications deployed at the multiple data centers.

The selection device and the directory server are electronic devices, e.g., computers. The selection device may be a mobile device. For example, a smartphone may be configured as a selection device by installing an app thereon, or by downloading a webpage configured for data center selection according to an embodiment.

Further aspects include a data center selection method and a directory serving method. An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter is a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a data center selection device, FIG. 1b schematically shows an example of an embodiment of a directory server, FIG. 1c schematically shows an example of an embodiment of a data center server running a test application, FIG. 2 schematically shows an example of an embodiment of a data center selection system, FIG. 3 schematically shows an example of an embodiment of a data center selection system, FIG. 4a schematically shows an example of an embodiment of data center selection method, FIG. 4b schematically shows an example of an embodiment of directory serving method, FIG. 5a schematically shows a computer readable medium having a writable part comprising a computer program according to an embodiment, FIG. 5b schematically shows a representation of a processor system according to an embodiment.

REFERENCE SIGNS LIST

The following list of references and abbreviations corresponds to FIGS. 1a-2, 5a, 5b and is provided for facilitating the interpretation of the drawings and shall not be construed as limiting the claims.

102 a cloud-based application system
100, 101 a data center selection device
130 a processor system
140 storage
150 communication interface
172 a computer network
200 a directory server
230 a processor system
240 a storage
250 a communication interface
300, 301, 310 a data center
311 a test application
312 an application
330 a processor system
340 a storage
350 a communication interface
1000, 1001 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

Figure 1A:
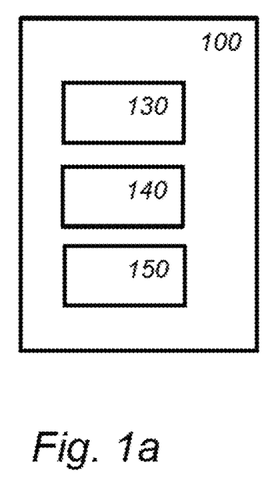
Figure 1B:
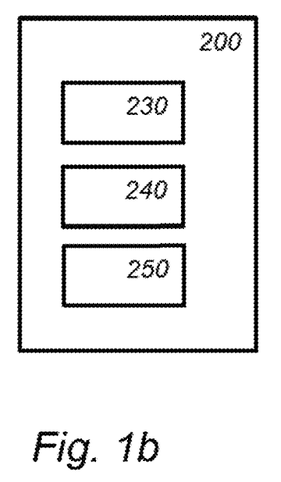
Figure 1C:
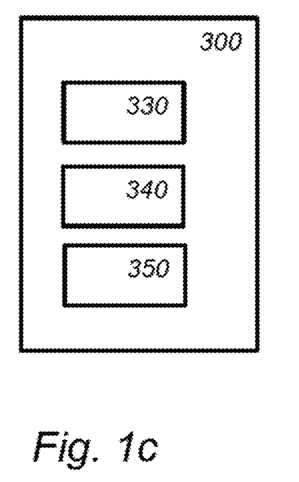

FIG. 1a schematically shows an example of an embodiment of a data center selection device 100. FIG. 1b schematically shows an example of an embodiment of a directory server 200. FIG. 1c schematically shows an example of an embodiment of a data center 300. Data center selection device 100, directory server 200 and data center 300 may be part of a data center selection system 102.

Data center selection device 100 is configured for selecting a data center for cloud-based application deployment. The directory server 200 cooperates with data center selection device 100. For example, directory server 200 may be configured to provide data center selection device 100 with computer network addresses of multiple data centers. Directory server 200 may cooperate with data center selection device 100 in other ways, as discussed herein. Data center 300 is configured to host a test application. Data center 300 may be referred to instead as a cloud server, or data server. Data center 300 is configured to host applications in the cloud. Data center 300 is also configured to host an application, e.g., an application as instructed by data center selection device 100 if data center 300 is selected. Data center selection system 102 may be used to host many types of software applications, e.g., databases, computing applications, and the like.

Typically, data center selection system 102 comprises many data centers 300. Selecting the right data center then becomes a problem, as the local latency of an application, e.g., as experienced by an end-user, may be dominated by network latency. Network latency can be very different, depending on the chosen data center 300. Using a data center selection device 100 alleviates this problem.

Data center selection device 100 may comprise a processor system 130, a storage 140, and a communication interface 150. Directory server 200 may comprise a processor system 230, a storage 240, and a communication interface 250. Data center 300 may comprise a processor system 330, a storage 340, and a communication interface 350.

Storage 140, 240 and 340 may be, e.g., electronic storage, magnetic storage, etc. The storage may comprise local storage, e.g., a local hard drive or electronic memory. Storage 140, 240 and 340 may comprise non-local storage, e.g., cloud storage. In the latter case, storage 140, 240 and 340 may comprise a storage interface to the non-local storage. Storage may comprise multiple discrete sub-storages together making up storage 140, 240, 340. Storage may comprise a volatile writable part, say a RAM, a non-volatile writable part, e.g., Flash, a non-volatile non-writable part, e.g., ROM.

Storage 140, 240 and 340 may be non-transitory storage. For example, storage 140, 240 and 340 may store data in the presence of power such as a volatile memory device, e.g., a Random Access Memory (RAM). For example, storage 140, 240 and 340 may store data in the presence of power as well as outside the presence of power such as a non-volatile memory device, e.g., Flash memory.

Directory server 200 may have access to a database, e.g., stored at the directory server. The database may comprise computer network addresses of data centers, and/or of test applications hosted thereon. The database may also store network statistics, e.g., for the data centers, possibly in combination with the location of the data center selection device.

The devices 100, 200 and 300 may communicate internally, with each other, with other devices, external storage, input devices, output devices, and/or one or more sensors over a computer network. The computer network may be an internet, an intranet, a LAN, a WLAN, etc. The computer network may be the Internet. The devices 100, 200 and 300 comprise a connection interface which is arranged to communicate within data center selection system 102 or outside of data center selection system 102 as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The communication interfaces 150, 250, 350 may be selected from various alternatives. For example, the interface may be a network interface to a local or wide area network, e.g., the Internet, an application interface (API), etc. The communication interfaces may be configured to send and/or receive digital data. For example, the communication interface 150 may be configured for communication with a directory server, and for communication with multiple test applications hosted at data centers. The communication interface 150 may be used to send or receive digital data, e.g., receiving computer network addresses of multiple data centers, sending a request for test data, and for receiving the test data, etc.

The execution of devices 100, 200 and 300 may be implemented in a processor system. The devices 100, 200 and 300 may comprise functional units to implement aspects of embodiments. The functional units may be part of the processor system. For example, functional units shown herein may be wholly or partially implemented in computer instructions that are stored in a storage of the device and executable by the processor system.

The processor system may comprise one or more processor circuits, e.g., microprocessors, CPUs, CPUs, etc. Devices 100, 200 and 300 may comprise multiple processors. A processor circuit may be implemented in a distributed fashion, e.g., as multiple sub-processor circuits. For example, devices 100, 200 and 300 may use cloud computing.

Typically, the data center selection device 100, directory server 200 and data center 300 each comprise a microprocessor which executes appropriate software stored at the device; for example, that software may have been downloaded and/or stored in a corresponding memory, e.g., a volatile memory such as RAM or a non-volatile memory such as Flash.

Instead of using software to implement a function, the devices 100, 200 and/or 300 may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, data center selection device 100, directory server 200 and data center 300 may comprise circuits, e.g., for cryptographic processing, and/or arithmetic processing. A processor circuit may be implemented in a distributed fashion, e.g., as multiple sub-processor circuits. A storage may be distributed over multiple distributed sub-storages In hybrid embodiments, functional units are implemented partially in hardware, e.g., as coprocessors, e.g., a network processor, and partially in software stored and executed on the device.

Figure 2:
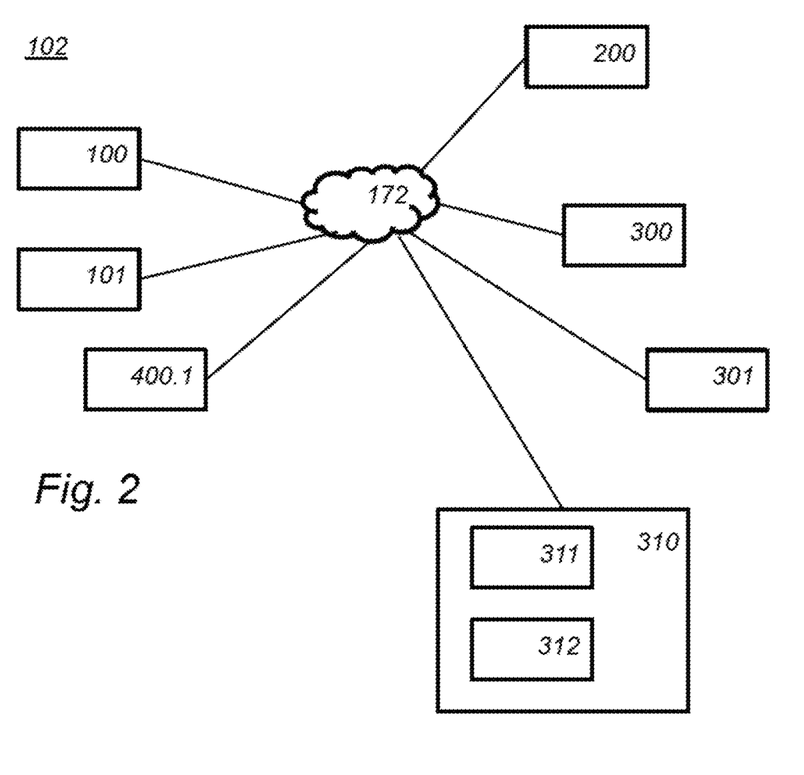

FIG. 2 schematically shows an example of an embodiment of a data center selection system 102.

Data center selection system 102 comprises a data center selection device, and may comprise multiple data center selection devices; shown are data center selection devices 100 and 101. Data center selection devices 100 and 102 may be configured as data center selection device 100 of FIG. 1a. Allowing multiple data center selection devices is advantageous, as network statistics depend on the location of the data center selection device, so that, different data center selection devices at different location may well obtain different network statistics; this in turn may lead to a different selection of a data center for deployment of an application. The data center selection system 102 may be configured to deploy an application on a data center.

Data center selection system 102 comprises a directory server 200. Data center selection system 102 may optionally comprise multiple directory servers. Data center selection system 102 comprise multiple data centers; shown are data centers 300 and 301. Data centers 300 and 301 are configured to host at least one test application, e.g., as in an embodiment. Also shown in FIG. 2 is a data center 310 hosting a test application 311 as well as an application 312. For example, data center 310 may have been selected by a data center selection device, using test application 311, after which application 312 is deployed, e.g., hosted, at data center 310.

The devices are connected through a computer network 172, e.g., the Internet. The selection device, directory server and/or data center may be according to an embodiment.

In an embodiment, a data center selection device, e.g., data center selection device 100, is configured to select a data center based at least in part on measured network statistics and causing the cloud-based application to be deployed at the selected data center.

For example, the processor of the data center selection device 100 may be configured to receive over its communication interface computer network addresses of multiple data centers that host a test application from directory server 200. Directory server 200 is configured to send a list of multiple computer network addresses of multiple data centers to the data center selection device.

The computer network addresses may be manually coded in directory server 200. In an embodiment, directory server 200 is configured to receive over its communication interface computer network addresses of multiple data centers. For example, if a new test application is hosted on a data center, e.g., a new data center, the test application may be configured to send a computer address to directory server 200; the computer address is configured for a data-selection device to reach the test application, e.g., to request test data. For example, the computer address may be a URL, an API, a network interface, and the like.

Directory server may be configured to maintain a directory of multiple data centers and multiple associated test applications deployed at the multiple data centers. A data center may host multiple test applications, though normally a datacenter just hosts one test application. For example, the latter may be useful if multiple data-selection devices are active at the same time. A data-selection device may be assigned a random test application of multiple test application running at a data center. On the other hand, it is also possible that a data center runs a single test application which may be configured to send test data to multiple requesting selection devices.

A test application may be installed independent of the directory server; e.g., after installation of the test application a computer network address may be supplied to the directory server. In also possible that the test applications are installed by the directory server. For example, the directory server may be supplied with a list of data centers. Using an application deployment API, the directory server deploy a test application on the data center in the data center list. For example, the directory server may periodically verify if a test application is still active, and if not, take corrective action, e.g., redeploy the test application, report a warning signal to an operation, and the like.

Data center selection device 100 is configured to determine network statistics. Optionally, software configured at least for measuring network connectivity statistics may be downloaded by data-selection device 100 from the directory server. Alternatively, said software may be obtained, e.g., downloaded from a different source.

In an embodiment, a test application at a first data center sends data directly back to the selection device. In an embodiment, further test data may be requested by a test application from another test application running at a different data center. For example, a first test application may be configured to request further test data from a second test application at the second data center. The second test application may send the further test data back to the first test application. The first application may measure the delay in receiving the further test data, or may forward the further test data in which case the selection device may measure the delay. Further statistics may be computed for the further test data, e.g., latency, bandwidth. The further statistics may also be included in an overall network delay statistics; e.g., averaged or the like.

Data center selection device 100 is configured for sending a request for test data from multiple test applications at the multiple data centers. Multiple requests for test data may be sent in parallel to the multiple data centers. The latter has the advantage of obtaining measurement results quicker, though if the number of parallel requests is large, this may change the results. In an embodiment, multiple batches of requests for test data are sent in parallel to a batch of data centers. For example, the size of a batch may be limited, e.g., to an upper limit; the upper limit may be selectable.

A test application is configured to send test data back to a data center selection device if it receives the request. The data center selection device is configured to measure network connectivity delays in receiving the test data from the multiple data centers. For example, a delay may be measured as a difference between a second timestamp obtained when the requested data is received and a previously recorded first timestamp at the moment the request was sent. Requests may be made for different types of test data, e.g., different sizes, for which different delays may be measured. Delays may be measured multiple times for multiple test data received from the same data center. The data center selection device is configured to determine separate network statistics for the multiple data centers from the measured network connectivity delays. A network statistics may comprise an average, a mode, e.g., a most frequent value, possibly after bucketing the measured delays, a median, a variation, e.g., a standard variation, and so on. For example, a network statistic may be computed by applying a statistical function to the measured delays, and optionally to the associated data sizes.

For example, a network latency may be obtained by measuring relatively small sized test data. For example, one or more requests may be made for one or more small packets of test data. For example, an average over the delays for small network packets gives an indication of network delay.

For example, a network bandwidth may be obtained by measuring relatively large sized test data. For example, one or more requests may be made for one or more large packets of test data. For example, an average over the delays for large network packets gives an indication of network bandwidth.

In an embodiment, a small packet is smaller than a large packet. The exact sizes of a small and/or large packet may depend on the application that is planned for deployment. As an indication small, may be taken as 1 kb, 10 kb, 100 kb or smaller. While larger may be taken a 100 kb, 500 kb, or larger. Different values are possible, depending on the application. A particular measurement, e.g., for a particular test data size and a particular data center may be done once or may be repeated multiple times, e.g., at least two times, at least four times, at least 10 times, and so on.

In an embodiment, a network connectivity statistic include multiple different statistics for a data center, e.g., a latency statistic and a bandwidth statistic. Latency may be measured as the time difference between a request for data and the reception of the requested data. For example, the unit of latency may be taken to be seconds. Bandwidth may be measured as the amount of data per time unit, e.g., as the amount of requested data divided by the time difference between a request for data and the full reception of the requested data. For example, the unit of bandwidth may be taken a kilobyte per second. Other units are possible. Typically, latency is measured with small payloads and bandwidth with larger payload, though this is not necessary.

In an embodiment, multiple network connectivity statistics are determined, and which are combined in a combined network connectivity statistic. For example, network latency and network bandwidth may be weighted into a single statistic. For example, a combined statistic may be: $\lambda_1 m_1 + \lambda_2 m_2$. Herein $\lambda_1$ and $\lambda_2$ are weights, and $m_1$ and $m_2$ are different statistics that are considered relevant. This could be network latency and network bandwidth. For example, one may weight latency 100 times more than bandwidth, or the like. Any other statistics may be used, e.g., network latency and network latency variance, or the like. More than two statistics may be combined as well.

In an embodiment, network measurements are obtained in two phases. In a first phase, the data center selection device requests test data from a first set of data centers, and measures the corresponding network connectivity statistics. From the first set a second smaller set is selected, based on the measured network connectivity statistics of the data centers in the first set. For example, the second set, may be best performing data centers found in the first phase, e.g., having the lowest network delays. In a second phase, the data center selection device requests test data from the second set of data centers, and measures associated network connectivity statistics. The second phase is typically performed after the first phase, although the two phases could partially overlap. For example, in the second phase, more test data is requested in the second phase from a data center in the second set than in the first phase. This may be because, in the second test data measurements are repeated, e.g., to obtain a more accurate average, or to measure over a longer duration. The second phase may be used to perform bandwidth tests, which require more data use. The data center for deploying the cloud-based application is selected from the second set.

A test application is configured to receive a request for test data, and to return that test data to the sender. The request may comprise a parameter, e.g., the size of the requested test data, or a number of requested packets, or a number of requested packets of a requested size, etc. The test data size may also be fixed. The test data size may be selected from a number of predetermined sizes; possibly from two predetermined sizes, e.g., small and large.

In an embodiment, a test application is configured to confirm the identity of the data center selection device. For example, a request for test data may comprise an authentication token, e.g., a digital signature, a message authentication code, or the like. In an embodiment, a test application sends a test message to the data center selection device, and only proceeds with sending test data if an expected answer is received on the test message. For example, the test message may comprise a nonce, which is to be returned by the selection device. In an embodiment, the test application performs a challenge response protocol with the data center selection device before sending the test data. Confirming the selection device avoids misuse of a test application for denial of service attacks. In an embodiment, a test application is configured to limit the amount of test data sent to a particular computer address, e.g., to a particular IP address.

In an embodiment, a test application may be configured to avoid caching of the test data. There are several ways to achieve this.

For example, a test application is configured to configure packets used for the test data such that they are not cached. For example, if an HTML interface is used, the no-caching flag may be used.

For example, a test application may be configured to select the test data randomly, e.g., using a random number generator. This also has the advantage of avoiding caching, e.g., in proxies.

For example, a test application may be configured to use a random computer network address for the test data, e.g., a random URL where the test data is downloaded by the selection device. This also has the advantage of avoiding caching.

Each of these measures against caching can be combined, e.g., in an embodiment a no caching flag is combined with random data, etc.

Test data may be generated or retrieved at the data center where the test application is installed. The test application may, in addition, or instead, request test data from another test application installed at another data center. For example, the software which is to be deployed may make use of an existing data center, e.g., for data or software stored there. In that case, good operation of the deployed software not only depends on low network delay to the deployed software, but also from the deployed software to the existing data center. The existing data center to use, may be included in the request from the test application, or may be implicit, e.g., hard coded in the test application.

For example, a first test application at a first data center may request further test data from a second test application at the second data center. The second test application may be included in the request from the selection device, or may be implicit.

For example, a test application may support two types of request: a first request from a selection device, and a second request from a test application. In the first case, further test data is requested from a second application. In the second case, no further test data is requested.

For example, a test application may request test data from a second type application. The second type second application is only installed at the second data center, and is configured to return test data to the test application, without requesting further test data. The first type test application both return locally obtained test data and request further test data.

The first application may measure the delay in receiving the further test data, or may forward the further test data in which case the selection device may measure the delay. Further statistics may be computed for the further test data, e.g., latency, bandwidth. The further statistics may also be included in an overall network delay statistics; e.g., averaged or the like.

Once network statistics for multiple data centers are obtained, e.g., using a single phase, or using a multi-phase approach, the data center selection device selects a data center based at least in part on the measured network statistics. The measured network statistics may be the sole determinant. For example, the lowest network latency data center may be selected, etc. But other factors may be taken into account. For example, pricing of the data center, affiliation, licensing, etc., may be weighted, e.g., after transforming to a numerical value indicating desirability. In this way, network statistics are one factor that is taken into account, among others. Another approach may be to filter the multiple data centers, e.g., on affiliation, and then taken the best performing one. In an embodiment, the selection device may be configured for displaying a visualization of at least part of the network statistics. For example, bar graphs, and the like may be used.

Once a data center has been selected, the selection device causes the cloud-based application to be deployed at the selected data center. For example, this may comprise sending a message to the data center over the computer network, to deploy the application. For example, the message may indicate that the application is to be hosted, and run. For example, the message may configure the cloud-based application at the selected data center for deployment. In an embodiment, the application needs to be installed at the data center, e.g., if it not there yet. For example, the selection device may send an upload request to a further server instructing the further server to upload the cloud-based application to the selected data center. For example, the further server may be a data center; possibly a different data center than the one selected on the basis of network connectivity statistics. The further server may be among the tested data servers, though this is not necessary. For example, the further server may be the directory server.

For example, in an application, a user may wish to demonstrate a software package at a client. At the client, the user uses his/her data center selection device to find a data center with favorable network statistics, and causes the demo software to be deployed, e.g., installed, configured, executed, on the selected data center. In advance of the meeting the user cannot know which data center would be advantageous for the demonstration. A better demonstration is obtained because network delays do not obscure the working of the software. For example, a single computer, e.g., a laptop, may be used for data center selection and for using the application.

For example, in an application, a user may wish to use a software package at a manufacturing plant, e.g., a factory floor. At the site of the plant, the user uses his/her data center selection device to find a data center with favorable network statistics, and causes the plant software to be deployed, e.g., installed, configured, executed, on the selected data center. The user experiences better software because of better network statistics. For example, the plant software may be logistical software to plan the flow of goods in the plant. For such an application a low-latency is important, as network packets are typically small, but delays add up.

The deployed application may be accessed from the same device as was used to select the data center. For example, a computer, e.g., a smartphone, tablet, or laptop, may be configured as a data center selection device using suitable software, and after deployment of the application at a selected data center, the same computer may be used to access the application in the cloud. This is not necessary though. For example, a first device may be used as data center selection device. After deployment, the application may be used from another device, possibly, from multiple other devices.

Below several further optional refinements, details, and embodiments are illustrated.

Figure 3:
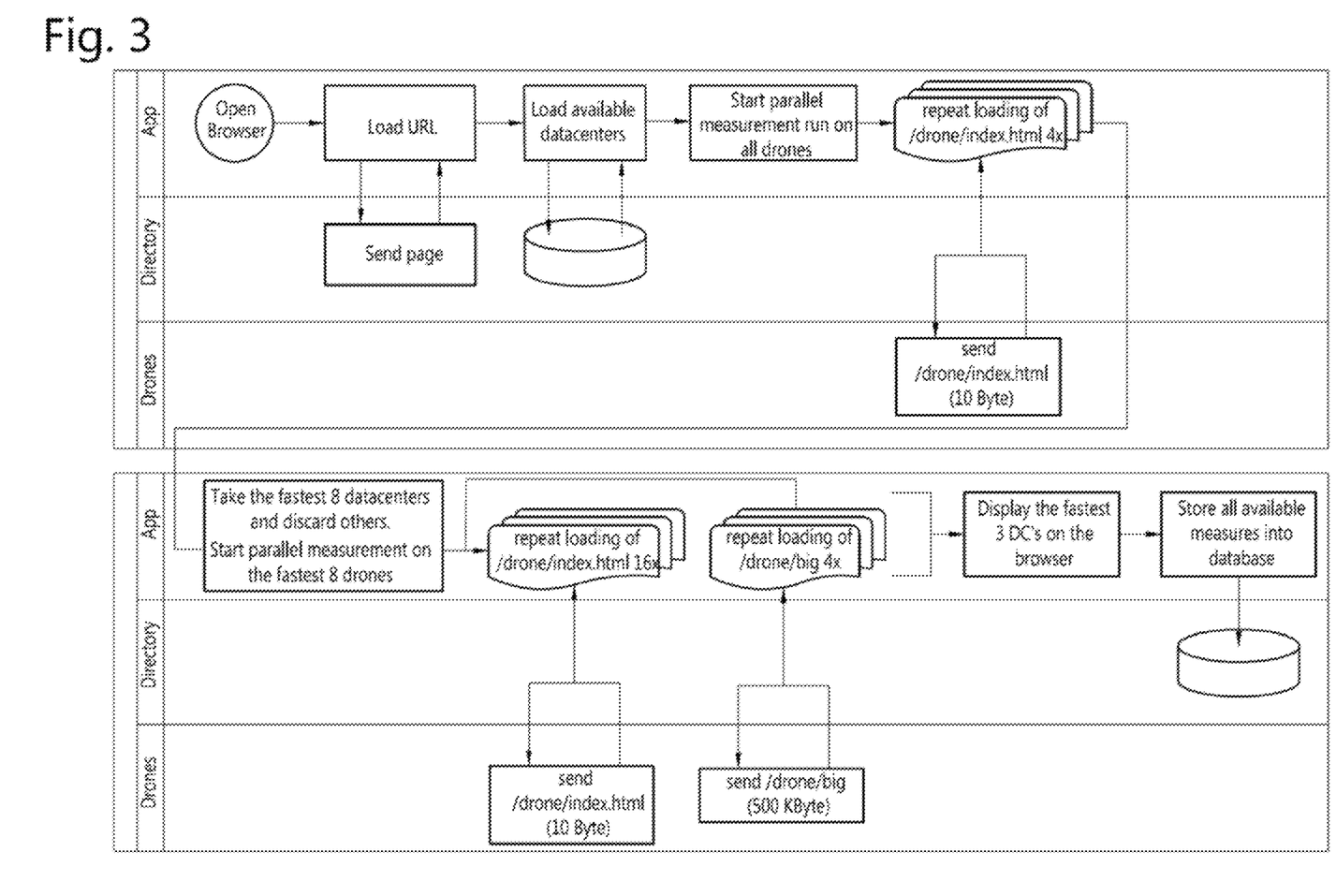

FIG. 3 schematically shows an example of an embodiment of a data center selection system. The figures show a flowchart of actions taken by various actors.

Shown in FIG. 3 are an app. For example, the app may be a software application running on a mobile phone. The app is an example of a data center selection device. The embodiments illustrated with FIG. 3 could be modified to use a different implementation. For example, the data center selection device could be implemented as software running on a computer, e.g., a laptop, desktop, or the like. The data center selection device could be implemented as a stand-alone device, if desired.

Shown in FIG. 3 is a directory. The directory refers to a directory server.

Shown in FIG. 3 are drones. A drone refers to a test application running on a data center. Although only one row is shown for the drones, typically multiple drones are implemented. Typically, drones work alike, and may even be implemented as wholly or partially identical software. On the other hand, different drones software may be created, e.g., compiled, e.g., to support different computer architectures, operating systems, and the like. For example, different drones could be linked to different libraries.

The app, e.g., the selection device, may run in a browser, e.g., Chrome, Firefox, Edge, Safari, etc. This does not usually require installation and enables mobile use. The app may run measurements and optionally display results of the measurements.

The directory server may comprise, e.g., webserver, e.g., a NodeJS-based webserver. The directory server may host the app. The directory server may host a data center selection system database. The directory server may optionally store measurements.

A drone, e.g., a test application, may comprise a webserver, e.g., a NodeJS-based webserver. The drone may be self-hosted. The drone is configured to generate or host test data, e.g., a payload. The drones may be configured to respond to a call of the selection device.

A data center selection system API may be implemented, e.g., as a JavaScript API. The API may be used for the low level implementation of the data center selection system functionality. The API does not need a user interface. The data center selection system may implement the API, e.g., at the test applications In a cloud-based environment the experienced performance is typically influenced by two key factors, the network latency, and the bandwidth the network is capable to transfer the data to the client. The data center selection system may use modern browser technology on an application layer level and use the TCP/IP implementation of the OSI layer model on the client operating system. Other implementation choices are possible.

In an embodiment, the data center selection app is executed in a browser. As a result the network connectivity delays, and associated separate network statistics, e.g., values of latency and bandwidth, are influenced by the browser itself and its capability to run performant requests. The browser technology thus has some impact on the obtained values. However, modern browsers are highly optimized on content loading, and the values for different data centers are impacted similarly, so that relative ranking is not much impacted. Empirical tests showed reliable results even with network tests running in a browser. Although implementing a data selection device as an app running in a browser is only one implementation option, this option has the advantage of supporting a wide range of hardware, at little drawback. Using a browser operated software, also has the advantage that the selection software is available on nearly every device without having to install extra applications.

In an embodiment, the web app is configured for parallel content loading, so that multiple tests can be run in parallel. The app may be configured with an HTML frontend. For example, the frontend may be configured to display the, say, three best data centers found for the client's location. No interaction of the user is needed. For example, the operator of the mobile device on which the app runs, may go to the location where an application will be used, e.g., a factory floor, a client, an office, etc. On location the data center selection can be run, and the application deployed for use at that location. The deployed application may use the same network as the data center selection device uses, e.g., an Internet connection.

In an embodiment, the app provides further options, e.g., the possibility to filter the data centers, to send the results via email, to stop running measurements, to trigger a reload, start a Selection device Analytics View that gives more possibilities to compare measurements, and so on.

For example, filtering data centers may be implemented as a drop-down that enables the user to select from a list of data centers. To only run measurements for the ones, the user is interested in. For example, data centers may be restricted to data center from a particular operator, e.g., only Google or only Amazon, etc.

For example, the network statistics may be sent to the directory server, possibly together with the location of the app. In an embodiment, the directory server can compile likely good data centers given a location. For example, in an embodiment, a data center selection device may contact the directory server for network addresses of test applications; the selection device may also receive recommendation for likely network performant data centers. The recommended data centers may be tested preferentially. For example, the recommended data centers may be directly promoted to a second testing phase, while non-recommended data centers are pre-tested in a first phase. It is not required that the directory server provides all possible data center addresses. For example, a data center that is likely to be unsuitable, e.g., given a location, may not be provided by the directory server. For example, a data center may be configured to only provide such unlikely data centers, if the user requests broader testing, e.g., from the app.

For example, in an embodiment of a directory server, the processor may be configured for maintaining network delay statistics for the multiple data centers associated with a measurement location, receiving a request from a datacenter selection device for addresses of multiple data centers having a test application, and a location, selecting data centers from the maintained network delay statistics having low network delay for the received location, and sending a list of computer addresses for contacting the test application at the selected data centers.

An analytics view may provide the possibility to compare different data centers or regions, or providers, etc.

The directory server may comprise a webserver. The directory server may provide an interface that enable the selection device to obtain computer network addresses of data centers and/or test applications. The directory server may provide an interface that enable the selection device to store measurement data in the database. The interface of the directory server may be implemented as a REST endpoint.

The Directory server may serve the app the implements the selection device and send it to the client's browser.

When the app is started it retrieves a list of available data centers via the interface, e.g., a REST endpoint/datacenters. The data center selection device and/or directory server may provide a filter functionality. For example, a selection device may use a URL to request a list of test applications; filtering can be attached to the request, e.g., to the URL. For instance, /datacenters?f=Europe may return a list of all European data centers.

To store the measurement data in the database the Directory server may provide a REST-POST endpoint (/measurement) that retrieves the data in the body and stores them in the data center selection system database.

The data center selection system can be used via an API. The data center selection system API is a basic implementation of the core data center selection system functionality measuring latency and bandwidth.

A test application, e.g., a drone, may comprise a webserver, and may be configured to provide different payloads, e.g., via HTTPS. For example, the two payloads may be configured:

Latency: /drone/index.html (e.g., ~10 Byte)
Bandwidth: /drone/big (e.g., ~500 Kbyte)

Modern internet network infrastructure is optimized to deliver webpage content very fast on the best possible way to client browsers. Network components, e.g., a proxy cache, may be included within this infrastructure that cache content between selection device and test application. This is preferably avoided as data center selection system to measure the speed to a data center and not the speed to the next proxy cache.

To address this caching problem the test application may generate the payload on randomly. This content cannot be cached by network proxies as the proxy cache recognizes that the page has been changed since the last call.

A test application may be implemented as a Docker container. Such a container can easily be set up, has a small footprint, and runs on small cloud VM instances. Instead of docker container, a test applications may make use of existing webservers like IIS, Apache, NGINX, etc. as well. The docker container drone is preferred, as it was found to be easier to avoid caching of content.

An advantage of the data center selection system is to help users find a fast data center. For example, in an application the data center selection system may provide a 1-stop-shop portal to measure a data center in which in turn application software can be run. For example, one can send a prospective new user of an application a direct link to analyze the network performance from customer location to the respective data centers, at the best data center the application, or demonstration thereof, can then be deployed.

FIG. 3 shows a possible sequence of actions that a selection device, directory server and test application(s) could coordinate.

At the top left the sequence start with a user opening a browser. In the browser, a HTML page of the directory server is opened, e.g., by browsing to a particular URL. The directory server responds by sending a page to the browser. The page causes loading in the browser of a list of available data centers from the directory server, which the directory server retrieves from a database. The page then causes the browser to start parallel measurements from multiple drones, as indicated in the retrieved list. For example, the page may cause the repeated loading of a page of the drones. For example, the loading may be repeated 4 times. The drones respond by sending the requested pages. The page may be a small instance, e.g., 10 bytes.

The page then causes the browser to select the data centers with the lowest network latency, e.g., the top 8, and to start parallel measurement on the selected data centers. The page then causes the browser to repeatedly download in parallel a small payload from the drones and a large payload. For example, the small payload may be requested 16 times, while the large payload may be requested 4 times. The drones respond by sending the requested payload. Finally, statistics represented the measured network delay is displayed in the browser. The measurements may also be stored in a database of the directory server. Finally, the page may cause deployment of an application at a selected data center.

Figure 4A:
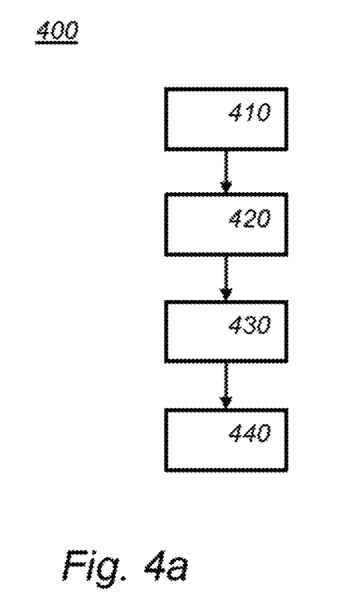

FIG. 4a schematically shows an example of an embodiment of data center selection method 400 for cloud-based application deployment. The method comprises communicating 410 with a directory server, and with multiple test applications, receiving 420 computer network addresses of multiple data centers, sending a request for test data from multiple test applications at the multiple data centers, measuring 430 network connectivity delays in receiving the test data from the multiple data centers, determining separate network statistics for the multiple data centers from the measured network connectivity delays, selecting 440 a data center based at least in part on the measured network statistics and causing the cloud-based application to be deployed at the selected data center.

Figure 4B:
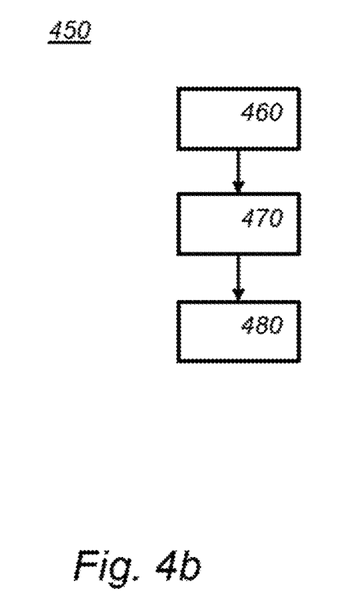

FIG. 4b schematically shows an example of an embodiment of directory serving method 450 for use with a data center selection device for cloud-based application deployment. The directory serving method comprises communicating 460 with the data center selection device for cloud-based application deployment maintaining 470 a directory of multiple data centers and multiple associated test applications deployed at the multiple data centers, sending 480 computer network addresses of multiple data centers to the data center selection device.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 400 and/or 450. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 5A:
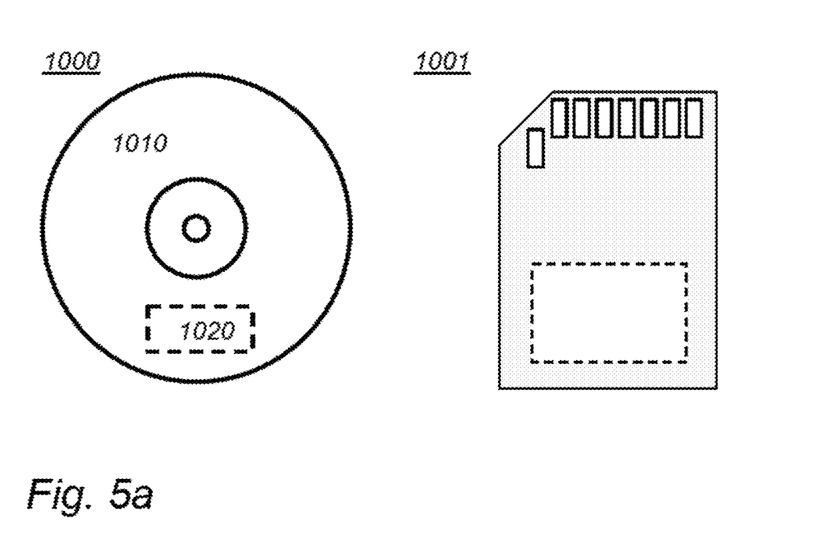

FIG. 5a shows a computer readable medium 1000 having a writable part 1010, and a computer readable medium 1001 also having a writable part. Computer readable medium 1000 is shown in the form of an optically readable medium. Computer readable medium 1001 is shown in the form of an electronic memory, in this case a memory card. Computer readable medium 1000 and 1001 may store data 1020 wherein the data may indicate instructions, which when executed by a processor system, cause a processor system to perform an embodiment of a data center selection method and/or a directory serving method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said data center selection method and/or a directory serving method.

Figure 5B:
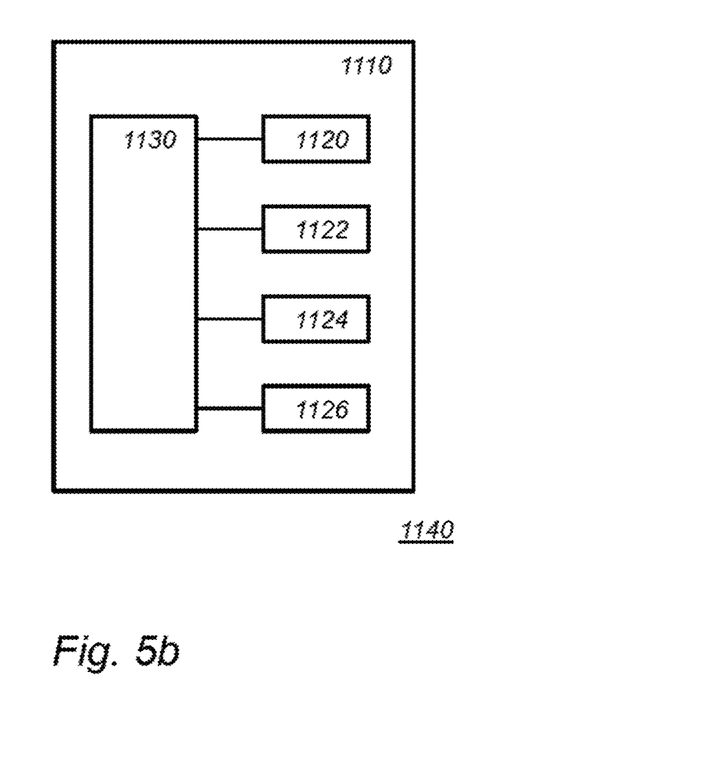

FIG. 5b shows in a schematic representation of a processor system 1140 according to an embodiment of a data selection device and/or directory server. The processor system comprises one or more integrated circuits 1110. The architecture of the one or more integrated circuits 1110 is schematically shown in FIG. 5b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the data selection device and/or directory server may comprise a processor circuit and a memory circuit, the processor being arranged to execute software stored in the memory circuit. For example, the processor circuit may be an Intel Core i7 processor, ARM Cortex-R8, etc. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

What is claimed is:

1. A data center selection device for cloud-based application deployment, the device comprising:
   a communication interface configured for communication with a directory server, and for communication with multiple test applications; and
   a processor configured for:
   receiving over the communication interface computer network addresses of multiple data centers;
   executing a test application to:
   send a request for test data from multiple test applications at the multiple data centers;
   measure network connectivity delays in receiving the test data from the multiple data centers, and determine separate network statistics for the multiple data centers from the measured network connectivity delays; and selecting a data center to host the cloud-based application based at least in part on the measured network statistics and causing the cloud-based application to be deployed at the selected data center.

2. A data center selection device as in claim 1, wherein the processor is configured to configure the cloud-based application at the selected data center for deployment.

3. A data center selection device as in claim 2, wherein the processor is configured to send an upload request to a further server instructing the further server to upload the cloud-based application to the selected data center.

4. A data center selection device as in claim 3, wherein the network connectivity statistics include a latency statistic and/or a bandwidth statistic.

5. A data center selection device as in claim 1, wherein the request for test data from a test application at a first data center includes a request for test data from a second data center, the test application being configured to request test data from a test application at the second data center.

6. A data center selection device as in claim 5, wherein the processor is configured to download from the directory server software configured at least for measuring the network connectivity statistics.

7. A data center selection device as in claim 5, wherein multiple requests for test data are sent in parallel to the multiple data centers.

8. A data center selection device as in claim 1, wherein the processor is configured for:
   in a first phase, requesting test data from a first set of data centers, and measuring associated network connectivity statistics;
   selecting from the first set a smaller second set based on the measured network connectivity statistics of the data centers in the first set; and
   in a second phase, requesting test data from the second set of data centers, and measuring associated network connectivity statistics, wherein
   more test data is requested in the second phase from a data center in the second set than in the first phase, and wherein the data center for deploying the cloud-based application is selected from the second set.

9. A data center selection device as in claim 8, wherein the test applications are configured to send random data and/or use randomized URLs.

10. A data center selection device as in claim 9, wherein the processor is configured for displaying a visualization of at least part of the network statistics.

11. A data center selection method for cloud-based application deployment, the method comprising:
   communicating with a directory server, and with multiple test applications;
   receiving computer network addresses of multiple data centers;
   executing a test application to:
      send a request for test data from multiple test applications at the multiple data centers;
      measure network connectivity delays in receiving the test data from the multiple data centers, and
      determine separate network statistics for the multiple data centers from the measured network connectivity delays; and
   selecting a data center to host the cloud-based application based at least in part on the measured network statistics and causing the cloud-based application to be deployed at the selected data center.

12. A data center selection method as in claim 11, the method comprising:
   in a first phase, requesting test data from a first set of data centers of the multiple data centers, and measuring associated network connectivity statistics;
   selecting from the first set a smaller second set of data centers based on the measured network connectivity statistics of the data centers in the first set; and
   in a second phase, requesting test data from the second set of data centers, and measuring associated network connectivity statistics, wherein
   more test data is requested in the second phase from a data center in the second set than in the first phase, and wherein the data center for deploying the cloud-based application is selected from the second set.

13. A data center selection method as in claim 12, wherein the test applications are configured to send random data and/or use randomized URLs.

14. A data center selection method as in claim 11, wherein the request for test data from a test application at a first data center includes a request for test data from a second data center, the test application being configured to request test data from a test application at the second data center.

15. A non-transitory computer readable medium comprising data representing instructions, which when executed by a processor system, cause the processor system to:
   receive over a communication interface computer network addresses of multiple data centers;
   execute a test application to:
      send a request for test data from multiple test applications at the multiple data centers;
      measure network connectivity delays in receiving the test data from the multiple data centers, and
      determine separate network statistics for the multiple data centers from the measured network connectivity delays; and
   select a data center to host the cloud-based application based at least in part on the measured network statistics and causing the cloud-based application to be deployed at the selected data center.

16. A non-transitory computer readable medium as in claim 15, wherein the instructions, when executed by a processor system, cause the processor system to configure the cloud-based application at the selected data center for deployment.

17. A non-transitory computer readable medium as in claim 16, wherein the instructions, when executed by a processor system, cause the processor system to send an upload request to a further server instructing the further server to upload the cloud-based application to the selected data center.

18. A non-transitory computer readable medium as in claim 17, wherein the network connectivity statistics include a latency statistic and/or a bandwidth statistic.

19. A non-transitory computer readable medium as in claim 15, wherein the request for test data from a test application at a first data center includes a request for test data from a second data center, the test application being configured to request test data from a test application at the second data center.

20. A non-transitory computer readable medium as in claim 15, wherein the instructions, which when executed by a processor system, cause the processor system to:
- in a first phase, request test data from a first set of data centers, and measuring associated network connectivity statistics;
- select from the first set a smaller second set based on the measured network connectivity statistics of the data centers in the first set; and
- in a second phase, request test data from the second set of data centers, and measuring associated network connectivity statistics, wherein more test data is requested in the second phase from a data center in the second set than in the first phase, and wherein the data center for deploying the cloud-based application is selected from the second set.

\* \* \* \* \*